(12) United States Patent
Giguere et al.

(10) Patent No.: US 9,432,206 B2
(45) Date of Patent: Aug. 30, 2016

(54) TESTING NETWORK COMMUNICATIONS LINKS

(75) Inventors: Bruno Giguere, Pierrefonds (CA); Isabelle Piette, Kirkland (CA); Michel Grenier, Montreal (CA)

(73) Assignee: EXFO Inc., Quebec (CA)

(*) Notice: Subject to any disclaimer, the term of this patent is extended or adjusted under 35 U.S.C. 154(b) by 509 days.

(21) Appl. No.: 13/577,158

(22) PCT Filed: Feb. 4, 2011

(86) PCT No.: PCT/CA2011/000131
§ 371 (c)(1),
(2), (4) Date: Aug. 3, 2012

(87) PCT Pub. No.: WO2011/094851
PCT Pub. Date: Aug. 11, 2011

(65) Prior Publication Data
US 2012/0307666 A1    Dec. 6, 2012

Related U.S. Application Data

(60) Provisional application No. 61/301,798, filed on Feb. 5, 2010.

(51) Int. Cl.
*H04L 12/26* (2006.01)
(52) U.S. Cl.
CPC ........... *H04L 12/2697* (2013.01); *H04L 43/50* (2013.01)
(58) Field of Classification Search
None
See application file for complete search history.

(56) References Cited

U.S. PATENT DOCUMENTS

| 2005/0144328 | A1 | 6/2005 | McBeath |
| 2006/0045021 | A1 | 3/2006 | Deragon et al. |
| 2006/0221843 | A1* | 10/2006 | Cidon et al. ............ 370/248 |
| 2007/0223388 | A1* | 9/2007 | Arad et al. ............ 370/252 |
| 2007/0258382 | A1 | 11/2007 | Foll et al. |

(Continued)

FOREIGN PATENT DOCUMENTS

| CN | 1832573 A | 9/2006 |
| CN | 101490920 A | 7/2009 |

(Continued)

OTHER PUBLICATIONS

"EtherScope(TM) Series II Network Assistant—Getting Started Guide", Fluke Networks, May 2006, Rev. 1, Sep. 2006, USA.

(Continued)

*Primary Examiner* — Marcus R Smith
(74) *Attorney, Agent, or Firm* — Helene Chotard

(57) ABSTRACT

A method and apparatus for testing network links bi-directionally and independently employ local test apparatus (1000) at one end of the link (1105, 1110, 1115) and remote test apparatus (1200) at the opposite end of the link. The local test apparatus transmits test traffic to the remote test apparatus which analyzes the test traffic to determine characteristics of the link in the local-to-remote direction. While the analysis is taking place, the remote test apparatus transmits interim test results to the local test apparatus, i.e., while the remote test apparatus is still running the test and without disrupting the test. Preferably, the remote test apparatus transmits test traffic to the local test apparatus which the latter analyzes to determine characteristics of the link in the remote-to-local direction. The local test apparatus may report the test results for both directions. The network may be a connected or connectionless network.

16 Claims, 6 Drawing Sheets

Logic Diagram of Local and Remote test Apparatus

(56) References Cited

U.S. PATENT DOCUMENTS

| | | | |
|---|---|---|---|
| 2008/0219173 A1 | 9/2008 | Yoshida et al. | |
| 2008/0304420 A1 | 12/2008 | Deragon et al. | |
| 2009/0161559 A1* | 6/2009 | Bielig et al. | 370/242 |
| 2009/0287816 A1* | 11/2009 | Matta et al. | 709/224 |
| 2009/0296588 A1* | 12/2009 | Nishi et al. | 370/242 |
| 2011/0010585 A1* | 1/2011 | Bugenhagen et al. | 714/32 |
| 2011/0182191 A1* | 7/2011 | Jackson | 370/250 |

FOREIGN PATENT DOCUMENTS

| | | |
|---|---|---|
| EP | 1686724 A2 | 8/2006 |
| JP | 2009253475 A | 10/2009 |
| WO | WO2007143576 A2 | 12/2007 |

OTHER PUBLICATIONS

Search report, State Intellectual Property Office of the People's Republic of China, Apr. 21, 2014.

"Verifying Network Bandwidth", Application Note, EtherScope(TM) Series II Network Assistant, Fluke Networks, Jan. 2006.

"Advancements in Field Measurement of Ethernet Performance"—White Paper, EtherScope(TM) Series II Network Assistant, Fluke Networks, Apr. 2008.

Diallo, T. et al. "Testing with the RTU-310/G IP Services Test Heads", Application Note 216, EXFO, Apr. 2009.

The publication date of the following document was established using the Internet Archive Wayback Machine, Published Feb. 17, 2008, Ethernet Test Module—FTB-8510B Packet Blazer(TM), EXFO.

"Ethernet Test Module—FTB-8510B Packet Blazer—Network Testing-Transport and Datacom", EXFO Inc., Oct. 2010, 12 pages, Canada. Retrieved from the Internet: URL: http://www.tehencom.com/Companies/EXFO/FTB-8510B/EXFO_FTB-8510B.pdf [retrieved on Jun. 2, 2015].

\* cited by examiner

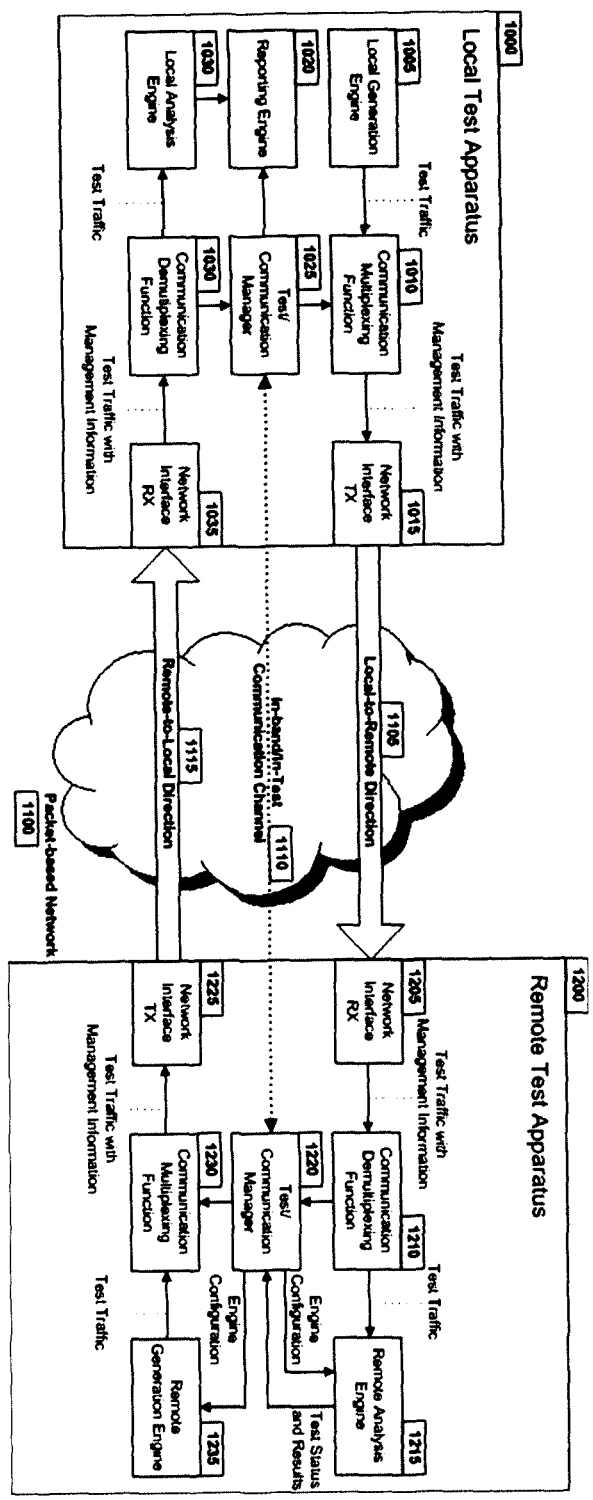
FIG. 1 Logic Diagram of Local and Remote test Apparatus

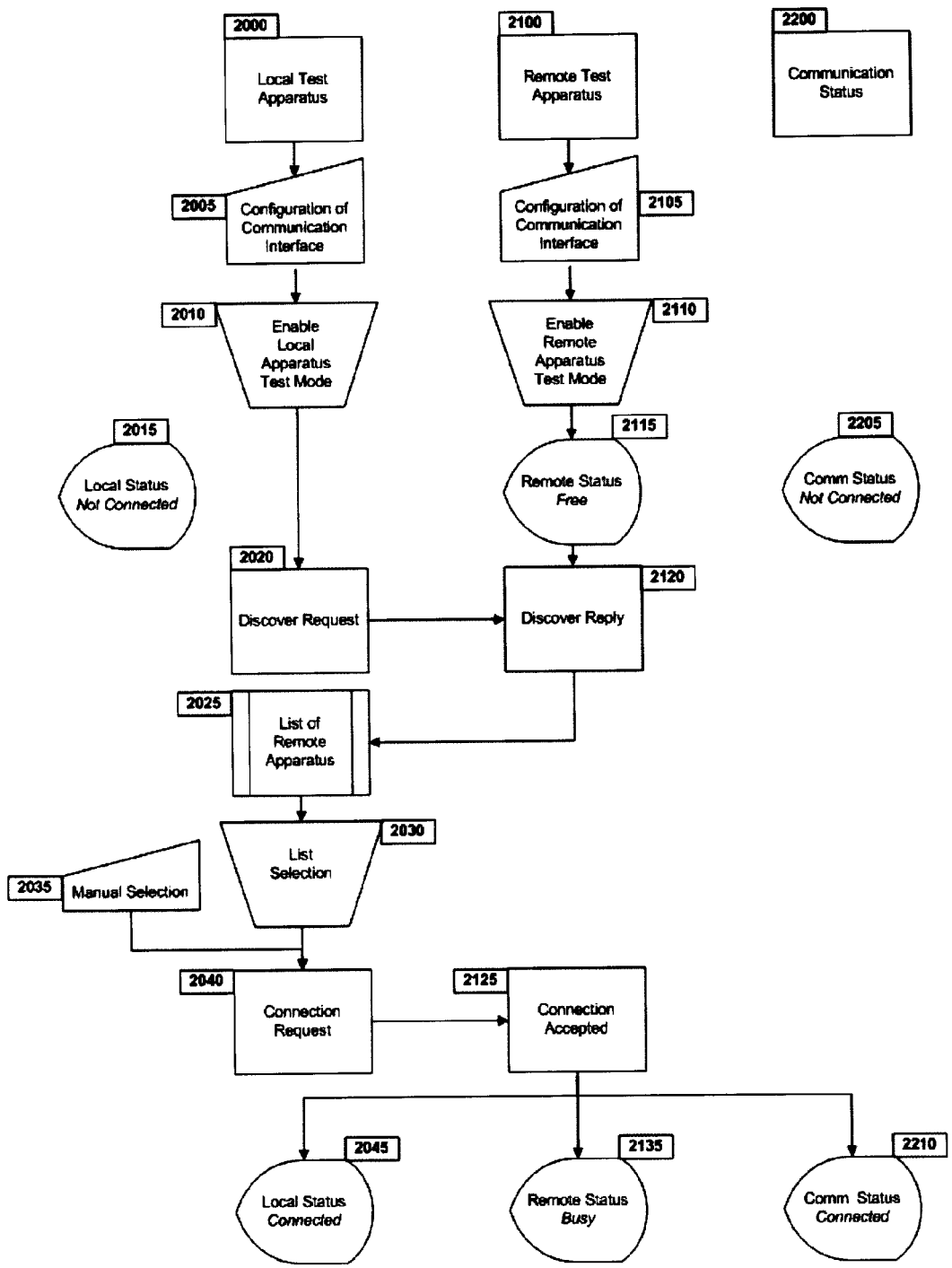
FIG. 2 Communication establishment flow chart

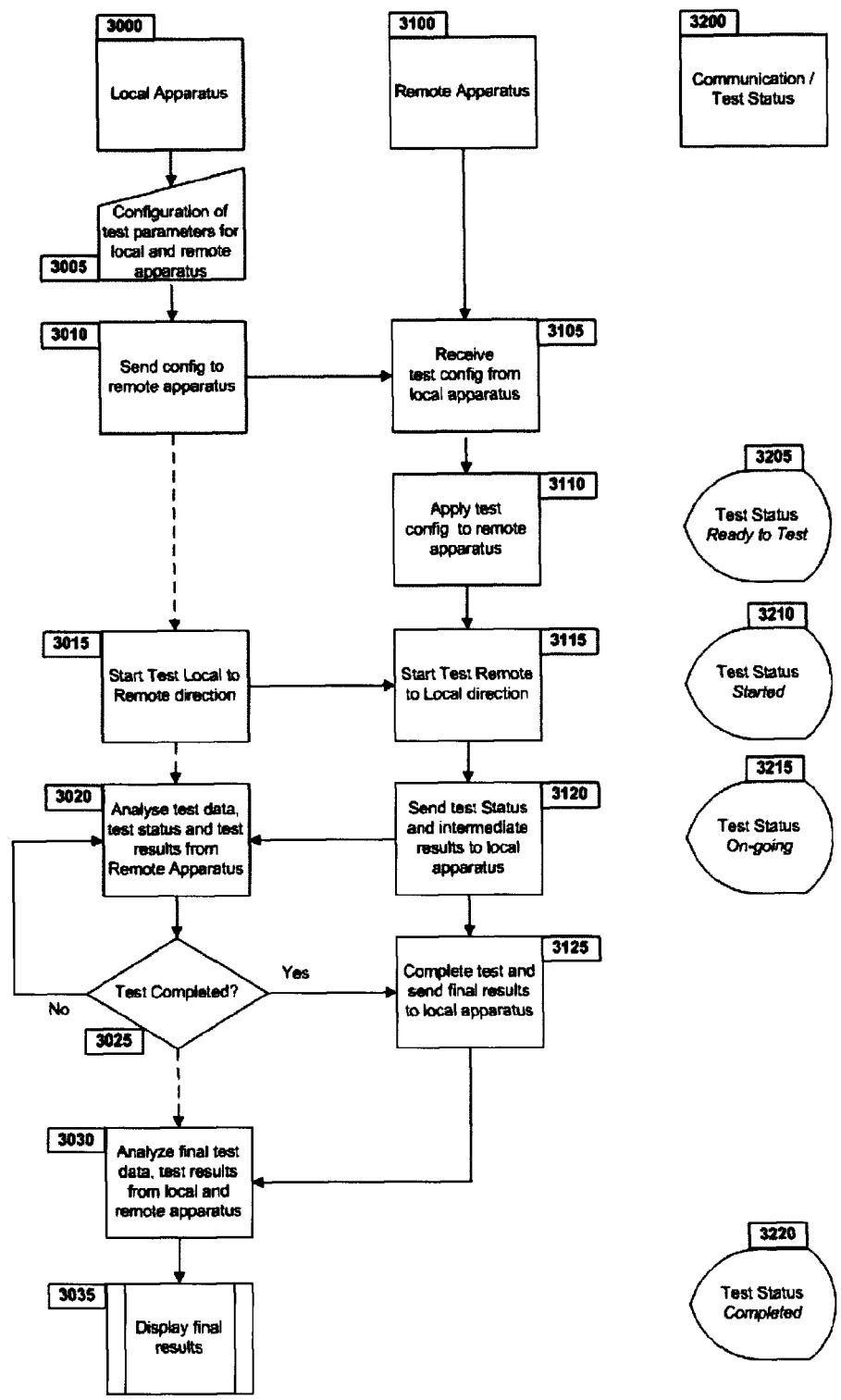
FIG. 3 Communication Test Mode Flowchart

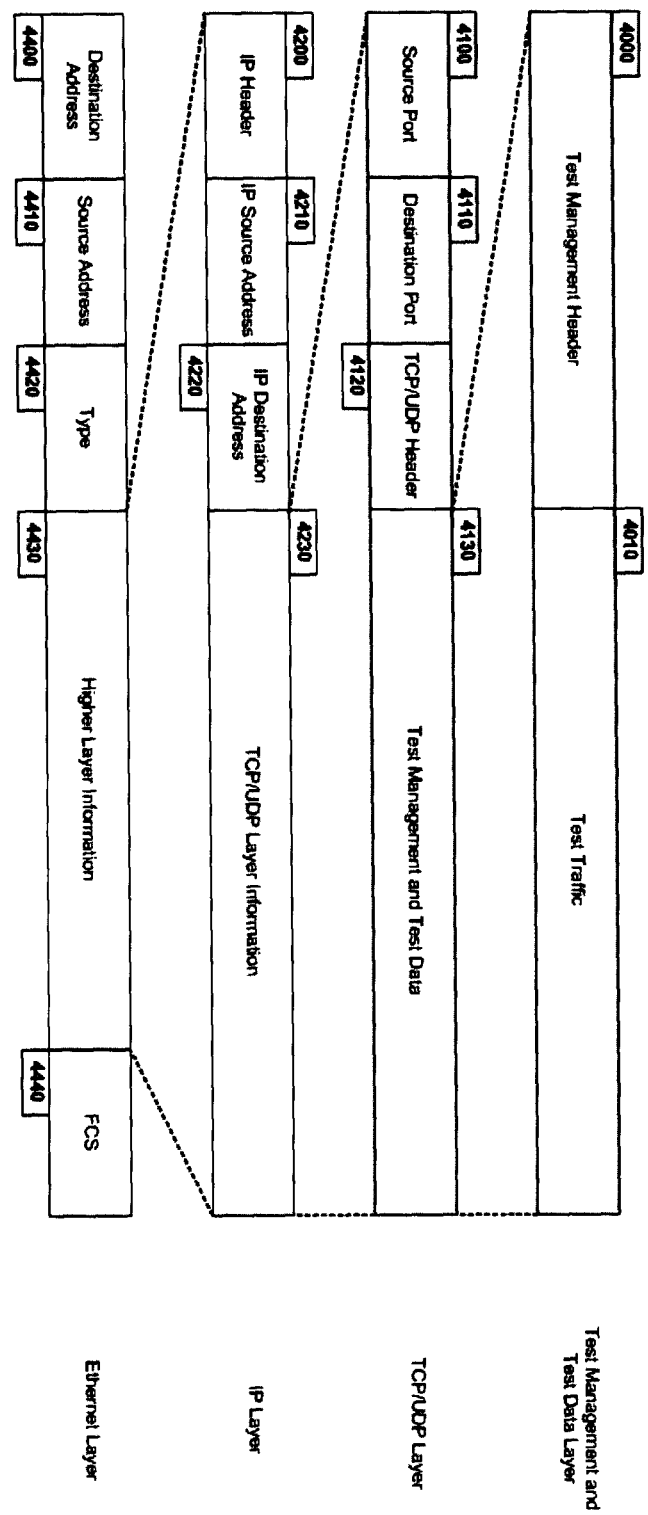
FIG. 4 Test Management and Test Data Frame Structure

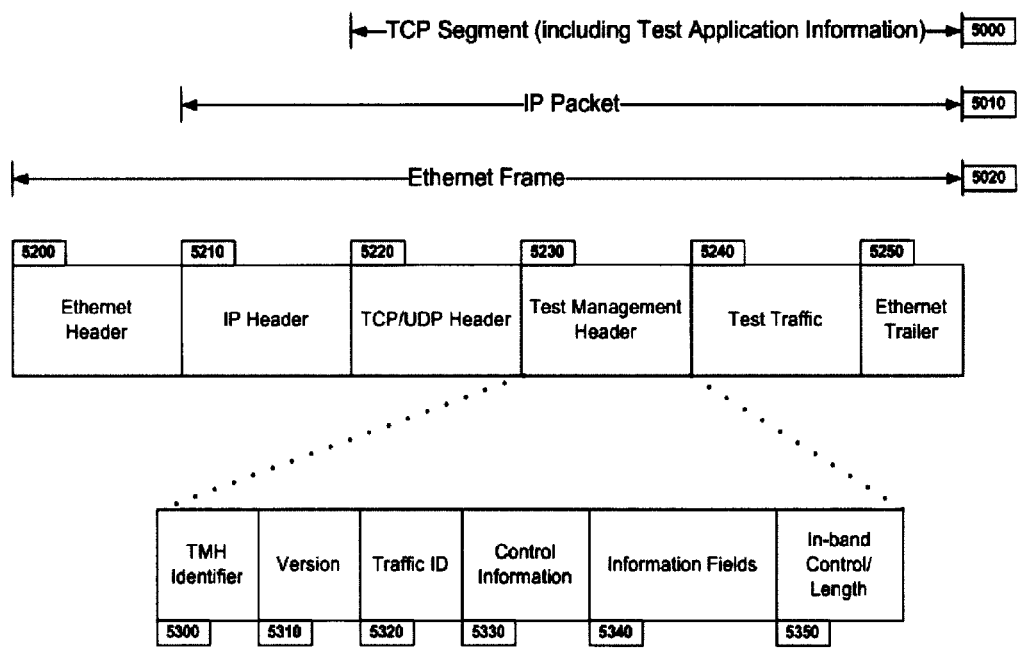
FIG. 5 Test Management Header in Ethernet Test Frame

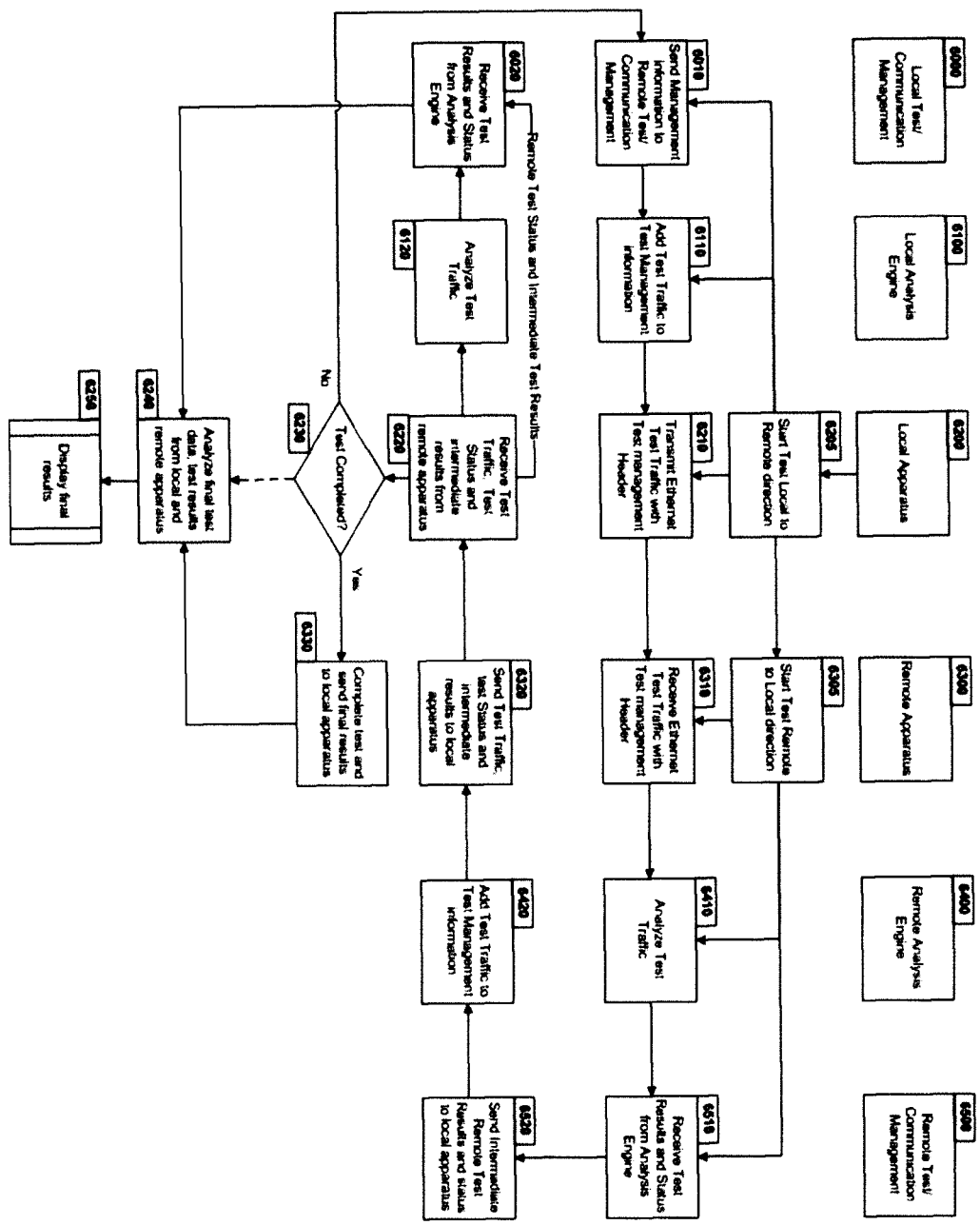
FIG.6 Active Test Management and Data Flow

TESTING NETWORK COMMUNICATIONS LINKS

CROSS-REFERENCE TO RELATED APPLICATIONS

This application is related to and claims priority from U.S. Provisional patent application No. 61/301,798 filed 5 Feb. 2010, the entire contents of which are incorporated herein by reference.

TECHNICAL FIELD

The present invention relates to a method and apparatus for testing communications links in communications networks and is especially, but not exclusively, applicable to the testing of communications links in packet-based communications networks, such as Carrier Ethernet networks.

BACKGROUND ART

The migration of communications networks from being based upon time-division multiplexing (TDM) to being packet-based necessitates adaptation of the methods and apparatus used for testing such networks.

In a packet-based network, the transfer of information is not based on time-multiplexing of several communication channels, but rather upon statistically-multiplexing packet-based traffic. To deliver traffic data from origin to destination, network elements rely upon addressing schemes found at multiple layers of communication protocols to ensure that traffic data gets delivered. Each packet has a header including addresses enabling packets of a particular message to travel separate paths and be reassembled at the destination. The migration to a packet-based architecture means that traffic data from multiple sources are distinguished by the header address and cannot be located by looking at different timeslots. This is a significant issue from a test and measurement perspective because TDM-based networks permitted single-ended testing, with test data simply being "looped back" unchanged at the far end. In a packet-based network, however, test traffic or data cannot simply be looped back unchanged.

Multiple patent applications have addressed this topic. U.S. Pat. No. 7,085,238 (McBeath), for example, discloses modifying header information of test packets at the far end, specifically by reversing the order of source and destination addresses, so that they can be returned to the originating network apparatus, enabling it to have the same test capability that is available in TDM-based network loopback.

U.S. Pat. No. 7,408,883 (Deragon et al.) and related continuation application US 2008/0304420 (Deragon et al.) each disclose a test apparatus and method for performing single-ended loopback testing in communications systems/networks that are packet-based. The procedure is similar to that disclosed in U.S. Pat. No. 7,085,238 but, according to Deragon et al. their procedure will reverse source and destination addresses that are "level 2" addresses, such as MAC addresses, and/or "level 3" addresses, such as IP addresses.

These methodologies and apparatus are not entirely satisfactory, however, because the measurement obtained by looping back the test traffic at one end of the network link under test will provide only a partial view of the situation. The test may indicate that a problem occurred somewhere during the round trip, but will not be able to identify whether it occurred along the forward path or the return path. Nowadays, some networks are asymmetrical in that the characteristics in one network direction are not the same as the characteristics in the opposite direction, i.e., downstream and upstream directions have different characteristics. It is desirable to be able to differentiate between the characteristics of the forward and return paths.

An instrument capable of differentiating between characteristics of forward and return paths is marketed by EXFO Inc. as the Packet Blazer™ FTB-8510B Ethernet test apparatus. With this test apparatus, it is possible to test an Ethernet circuit in both directions at the same time using a local test apparatus at one end of the path and a remote test apparatus at the other end, with the former controlling the latter, at least partially. Thus, both local and remote test apparatus transmit test traffic/data to each other and each analyzes the test traffic/data it received from the other. Once the tests have been completed, the remote test apparatus transmits its test results for the local-to-remote direction to the local test apparatus which collates them with the test results it derived, itself, for the remote-to-local direction.

While the Packet Blazer™ represents an improvement, it is not entirely satisfactory because some network testing needs to be carried out over a relatively long period of time, for example 24 hours or longer. Some problems that become apparent at the beginning of the testing period might be serious enough to justify aborting the testing until they have been resolved. Using the above-described testing apparatus and methods would not reveal such problems until the end of the lengthy test period, resulting in a significant waste of time.

SUMMARY OF INVENTION

The present invention addresses, as an object or problem to be solved, the elimination, or at least mitigation, of the limitations and disadvantages of these known testing apparatus and methods, or at least the provision of an alternative. To this end, in embodiments of the present invention, local test apparatus at one end of a network link transmits test traffic to remote test apparatus at the other end of the link. The remote test apparatus analyzes the test traffic received from the local test apparatus and, while doing so, transmits interim test results to the local test apparatus.

According to one aspect of the present invention, there is provided apparatus for performing bi-directional testing in a link of a communications network, the apparatus comprising local test apparatus for connection to one end of the link and remote test apparatus for connection to an opposite end of the link, wherein the local test apparatus is operable to transmit test traffic to the remote test apparatus by way of the link, and the remote test apparatus is operable to analyze the test traffic and, while doing so, transmit to the local test apparatus by way of the link test information including interim test results.

According to one preferred embodiment of this aspect of the present invention, there is provided apparatus for performing bi-directional testing in a link of a communications network comprising local test apparatus for connection to a local end of the link and remote test apparatus for connection to a remote end of the link, the local test apparatus and the remote test apparatus each being operable to transmit and receive in-band test traffic over the link and analyze received test traffic according to prescribed test procedures to obtain test results;

the local test apparatus being operable to transmit to the remote test apparatus via the link test information including test management information defining the prescribed test procedures to be carried out upon local-to-remote test traffic to be transmitted by the local test apparatus and received by the remote test apparatus;

the remote test apparatus being operable to receive the test management information, determine the test procedures to be carried out upon subsequently-received local-to-remote test traffic from the local test apparatus and send a confirmation transmission to the local test apparatus;

the local test apparatus being operable to detect the confirmation transmission and transmit to the remote test apparatus further test information comprising a header containing test management information and local-to-remote test traffic for testing the link in the local-to-remote direction;

the remote test apparatus being operable to receive the further test information and test traffic, analyze the local-to-remote test traffic in accordance with the prescribed test procedure, and, while analyzing of the local-to-remote test traffic is ongoing, transmit to the local test apparatus test information relating to the analysis of the received local-to-remote test traffic, said test information including at least interim test results, and remote-to-local test traffic for analysis by the local test apparatus to test the link in the remote-to-local direction;

the local test apparatus being further operable, on receipt of the further test information from the remote test apparatus, to extract and analyze the remote-to-local test traffic to determine characteristics of the link in the remote-to-local direction, detect the interim test results from the remote test apparatus; and consolidate the test results for both directions of the link.

According to a second aspect of the present invention, there is provided a method of performing bi-directional testing in a link of a communications network using local test apparatus connected to one end of the link and remote test apparatus connected to an opposite end of the link, wherein the local test apparatus is used to transmit test traffic to the remote test apparatus by way of the link, and the remote test apparatus is used to analyze the test traffic and, while doing so, transmit to the local test apparatus by way of the link test information including interim test results.

According to a preferred embodiment of this second aspect of the invention, there is provided a method of performing bi-directional testing in a communications link of a communications network using a local test apparatus at a local end of the link and a remote test apparatus at a remote end of the link, the local test apparatus and the remote test apparatus each being capable of transmitting and receiving in-band test traffic over the link and analyzing received test traffic according to prescribed test procedures to obtain test results, the method comprising the steps of:

at the local test apparatus, transmitting to the remote test apparatus via the link test data including test information defining the prescribed test procedures to be carried out upon local-to-remote test data to be transmitted by the local test apparatus and received by the remote test apparatus;

at the remote test apparatus, receiving the test data, detecting the test information and determining the test procedures to be carried out upon subsequently-received local-to-remote test traffic from the local test apparatus and sending a confirmation transmission to the local test apparatus;

at the local test apparatus, detecting the confirmation transmission and transmitting to the remote test apparatus further test data comprising a header containing management information and local-to-remote test traffic for testing the link in the local-to-remote direction;

at the remote test apparatus, receiving the further test data and analyzing the local-to-remote test traffic in accordance with the prescribed test procedure, and, while the analyzing of the local-to-remote test traffic is ongoing, transmitting to the local test apparatus further test data comprising a header containing information relating to the analysis of the received local-to-remote test traffic, said information including at least interim test results, and remote-to-local test traffic for testing the link in the remote-to-local direction;

at the local test apparatus, receiving the further test data from the remote test apparatus, extracting and analyzing the remote-to-local test traffic to determine characteristics of the link in the remote-to-local direction, and detecting the test management information from the remote test apparatus; and consolidating all test results on the local test apparatus.

Such apparatus and method advantageously allow test information to be exchanged between the local and remote test apparatus while the test is still running and without disrupting the test.

The remote test apparatus may report its present status with the interim test results.

The foregoing and other objects, features, aspects and advantages of the present invention will become more apparent from the following detailed description, taken in conjunction with the accompanying drawings, of a preferred embodiment of the invention, which description is by way of example only.

BRIEF DESCRIPTION OF THE DRAWINGS

In the drawings, identical or corresponding elements in the different Figures have the same reference numeral.

FIG. 1 illustrates a schematic and logic diagram of local and remote test apparatus of a preferred embodiment;

FIG. 2 is a flow chart illustrating how a communication link is established between the local remote test apparatus;

FIG. 3 is a flow chart illustrating communications between the local and remote test apparatus during a test mode;

FIG. 4 illustrates a Test Management and Test Data frame structure based on a multi-layer protocol frame;

FIG. 5 illustrates the content of a Test Management Header in an Ethernet test frame of the Test Management frame of FIG. 4; and FIG. 6 illustrates active test management and data flow within and between the test apparatus.

DESCRIPTION OF PREFERRED EMBODIMENTS

Embodiments of the present invention perform bi-directional testing of network links and provide results for both directions independently and substantially concurrently. The network may be a packet-based network and may be asymmetrical, though embodiments are applicable to other kinds of network. The network link may employ different physical paths in opposite directions and, in this specification, the term "bi-directional testing" is used to mean that the test apparatus can qualify the network link under test in both directions substantially concurrently. Typically, the test apparatus will use a proprietary or standardized test methodology (for example RFC 2544) and provide test results for both directions. An example of an asymmetrical network link might be a Digital Subscriber Line (DSL) circuit. In this type of network architecture, attributes (network throughput for example) in the downstream direction (network-to-subscriber) usually will differ from those in the upstream direction (subscriber-to-network).

As illustrated in FIG. 1, a first test apparatus 1000, designated the "local" test apparatus, and a second test apparatus 1200, designated as the "remote" test apparatus, are connected to opposite ends of a communications link 1105, 1110, 1115 in the network under test 1100, shown here as a packet-based network. For convenience, the communications link is shown as three separate parallel paths, namely a local-to-remote direction path 1105, a remote-to-local direction path 1115 and an in-band/in test communication channel 1110. As will be described later, the communication channel 1110 is within the packets transmitted between the test apparatus 1000 and 1200.

The local test apparatus 1000 and remote test apparatus 1200 operate as transceivers, each having transmission functions and reception functions. For the transmission functions, the local test apparatus 1000 comprises a local generation engine 1005, multiplexer 1010, transmission (TX) network interface 1015 and test/communication manager 1025. The local generation engine 1005 generates test traffic which the multiplexer 1010 combines with test/communication management information from test/communication manager 1025 and supplies the multiplexed data to the transmission (TX) network interface 1015 for transmission along the network link in the local-to-remote direction 1105. Similarly, the remote test apparatus 1200 has a remote generation engine 1235, test/communication manager 1220, multiplexer 1230 and transmission (TX) network interface 1225 which performs in a similar manner, the remote generation engine 1235 generating test traffic which the multiplexer 1230 combines with test/communication management information from test/communication manager 1220 and supplies to the TX network interface 1225 for transmission along the network link in the remote-to-local direction 1115.

For the reception functions, the local test apparatus 1000 has a local analysis engine 1035, communication demultiplexer 1030 and receiver (RX) network interface 1035. The RX network interface 1035 receives the remote-to-local transmission from the remote test apparatus 1200 and supplies it to the demultiplexer 1030 which separates the test management information from the test traffic and forwards the test management data and test traffic to the test communication manager 1025 and the local analysis engine 1030, respectively. Likewise, the remote test apparatus 1200 has remote analysis engine 1215, communication demultiplexer 1210 and receiver (RX) network interface 1205. The RX network interface 1205 receives the local-to-remote transmission from the local test apparatus 1000 and supplies it to the demultiplexer 1210 which separates the test management information from the test traffic and forwards the test management data and test traffic to the test communication manager 1220 and the remote analysis engine 1215, respectively.

In effect, the local test communication manager 1025 and the remote communication manager 1220 communicate with each other by inserting test management information into transmissions sent via the network interfaces 1015/1225 and extracting the information at the other end. This communication is represented in FIG. 1 as in-band-in-test communications channel 1110 interconnecting the local and remote test communications managers 1025 and 1220, respectively.

In operation, the local test apparatus 1000 will have more functionality than the remote test apparatus 1200 because it will be used to control the remote test apparatus. In particular, the local test apparatus 1000 will provide the remote apparatus 1200 with test management information enabling it to perform its own part of the required bi-directional testing and communicate to the local test apparatus not only information about its own status, but also intermediate test results while the testing is still taking place, followed by final test results when the testing ends. For this purpose, the local test apparatus 1000 has a reporting engine 1020 which receives information from both the test/communication manager 1025 and the local analysis engine 1030. The reporting engine 1020 receives from the local analysis engine 1030 the test results for the remote-to-local direction 1115 and receives from the test/communication manager 1025 the test results for the local-to-remote direction 1105 and outputs them, collated if desired, by any suitable physical means, such as a display device.

It should be noted that the local test apparatus and remote test apparatus could be identical, and configured as local (primary) and remote (secondary) before testing begins, perhaps according to where the network link is, but not necessarily because the user on the basis of where the user is located physically. Hence, the various modules, functions and signals flows shown in FIG. 1 would be duplicated as necessary to allow the test apparatus to function as local (primary) or remote (secondary).

Operation of the local and remote test apparatus 1000 and 1200 to perform bi-directional testing of the communications link 1105/1115 will now be described with reference also to FIGS. 2 to 6. The testing proceeds as follows:
1 Local and remote test apparatus configuration
2 Methodology to discover and connect to remote test apparatus
3 Test configuration and execution
4 Intermediate test status and results
5 Test completion 1 Local and Remote Test Apparatus Configuration In order for the test apparatus 1000 and 1200 to connect to the network under test, their respective TX and RX interfaces 1015, 1035, 1205 and 1225 need to be configured to communicate over the network. The specific configuration will depend upon the technology used in the network. In the case of a packet-based network, the usual parameters to configure are IP address 4210 and 4220, Transmission Control Protocol (TCP) or User Datagram Protocol (UDP) port 4100 and 4110 and VLAN (depending on network implementation, this parameter can be optional). In the case of a test apparatus, the physical port characteristics and the MAC address 4400 and 4410 can be modified to reflect particular applications. For the physical interface, the transmission media (electrical or optical), the transmission mode (Half or Full-Duplex) and the clocking mode are parameters that can be configured. Specifics of the configuration will be well-known to those of ordinary skill in this art and so will not be described in more detail herein.

In this communication methodology, not only the test interface needs to be configured, but the operation mode also needs to be defined. These modes can be local or remote test mode. Referring to FIG. 2, the first step of the methodology for each test apparatus is configuration of communication interface 2005, 2105. Most of the configuration will be done manually but some items may be defaults from the test apparatus in known manner; for example, parameters like IP addresses can be configured by the network (DHCP server).

Once the communication interface is configured, the test mode is enabled (local 2010 or remote test mode 2110). Once the test mode is activated, both apparatus will be ready to be used; the local test apparatus will have a local status of "Not connected" 2015 while the remote test apparatus will be in a "Free" state, meaning it can be connected to (Remote Status Free 2115).

2. Methodology to Discover and Connect to Remote Test Apparatus

The next step in the methodology is to discover all "Free" remote test apparatus within the network (or part thereof). The local test apparatus 1000 sends a "discovery request" 2020 to all remote apparatus connected to the network. All remote test apparatus 1200 with the status "Free" will return a "discovery reply" 2120 with their configuration parameters. The local test apparatus 1000 will then create (2025) a list of all "Free" remote test apparatus from which to choose to perform the test. The user can then activate the communication channel 1110 between local and remote test apparatus by selecting a particular remote apparatus 1200 from the list 2030, or entering manually (2035) the parameters of a remote apparatus 1200. A connection request 2040 will be sent from the local test apparatus 1000 to the selected remote test apparatus 1200 and the communication channel will be established 2125, 2210. The status for the local test apparatus 1000 will then be "Connected" 2045 and the status for the remote test apparatus 1200 will be "Busy" 2135. This "Busy" state will also be reported to other local test apparatus which might try to connect to the selected remote test apparatus 1200 while it remains controlled by the local test apparatus 1000.

3. Test Configuration and Execution

Once the local and remote test apparatus are connected, the user can conduct a test. The test parameters for both the local test apparatus 1000 and the remote test apparatus 1200 are configured from the local test apparatus 1000, as displayed at 3005 in FIG. 3.

As an example, where an RFC 2544 test is to be performed (Throughput, Burst, Frame Loss and/or Latency), test configuration parameters might include frame size to be used for each iteration (64, 128, 256, 512, 1024, 1280 and/or 1518 bytes), test timer, number of iteration, test accuracy, etc.

In steps 3010, 3105 and 3110, the remote test configuration is downloaded to the remote test apparatus 1200 and applied. The application of the test parameters is performed by the remote Test/Communication Manager (TCM) 1220. The TCM 1220 will configure the remote analysis engine 1215 for analysis of the received data at the remote test apparatus 1200, configure the remote generation engine 1235 to send test data to the local test apparatus 1000 via its TX network interface 1225 and synchronize the test procedure between the local and remote test apparatus. This synchronization is required so the local and remote test apparatus are using the same test configuration while executing a series of tests such as the ones illustrated in the RFC 2544 example.

The test apparatus are now ready to start testing. From the local test apparatus 1000, the test is started for both test apparatus 3015, 3115 and test statuses and intermediate results 3120 are transferred back from the remote test apparatus to the local test apparatus and displayed 3020. This transfer of information occurs while the test is still running and without disruption of the running test. Consequently, the intermediate test results are available to the local test apparatus 1000 before the test ends and can be reported, for example by being displayed. The user then has the option of intervening to abort or modify the test, or otherwise act upon the intermediate test results.

4. Intermediate Test Status and Results

Referring again to FIG. 1, the Test and Communication Managers 1025, 1220 use an In-band, In-Test communication channel 1110 to transfer information from the local test apparatus to the remote test apparatus. A reverse path also exists between the remote and local test apparatus for transfer of information from the remote test apparatus to the local test apparatus. The management information is sent to a communication multiplexing function 1010 that will add the management information to the test traffic. If there is no test traffic being sent (configuration stage), then the management traffic will be sent "as is". The test traffic with management information will then be sent to the transmission (TX) Network Interface 1015 to be sent across the circuit under test 1105, 1115 to the remote test apparatus 1200. (It should be appreciated that, in some packet-based system, the "circuit under test" may appear to be a discrete, physical path but will actually be a virtual circuit comprising physical circuits allocated as needed.)

At the receiver (RX) network interface 1205, the information is demultiplexed 1210 and the management information will be sent to the test and communication manager 1220. The test traffic will then be sent to the remote analysis engine 1215. At the remote analysis engine 1215, the test traffic will be analyzed and the test results and statuses will be kept. The rest of the test traffic information need not be saved or reused in the test and, hence, may be discarded. The test results and statuses will be sent to the remote test communication manager 1220 to be communicated back to the Test and Communication Manager 1025 of the local test apparatus 1000. Again, this management information will be multiplexed 1230 with the test traffic being generated by the remote generation engine 1235 and sent to the transmission network interface 1225.

Once the Ethernet Test Frame arrives at the Local Test Apparatus receiver (RX) Network Interface 1035, the Test Traffic and Management Information will be demultiplexed 1030. The Test Result and Status included in the Management Information will be sent to the Local Test and Communication Manager 1025 and finally transmitted to the Local Reporting Engine 1020. The Test Traffic found in the Ethernet Test Frame will be sent to the Local Analysis Engine 1030. The result and status of the Remote-to-Local direction will then be sent to the reporting engine 1020.

FIGS. 4 and 5 provide a view of the encapsulation process to create the Ethernet Test Frames. FIG. 4 provides a detailed view of all the different layers that need to be configured or populated for the Ethernet Test Frame to be transmitted from a test apparatus to another test apparatus. FIG. 4 represents a simplified version of the Open Systems Interconnection (OSI) seven layer protocol stack. FIG. 4 reflects the reality that some of the layers are defined in the standard but not used in real deployment.

At the top of the protocol stack resides the application layer. In embodiments of the present invention, the application layer includes a Test Management Header 4000 and the Test Traffic 4010. The Test Traffic can be a pseudo-random bit sequence (PRBS) or a repeated hexadecimal value. As all of the different layers are encapsulated into the payload of the lower layers, the Test Management Header and Test Traffic will become the payload of the TCP/UDP layer, also called the transport layer. As part this layer, there are multiple fields that are grouped together to form the transport header. FIG. 4 shows a summarized version of the transport header that is comprised of the Source Port 4100, Destination Port 4110 and rest of TCP/UDP header 4120. Adding the transport data field 4130 results in a complete transport segment. This segment will be placed in the payload of the underlying layer. In a packet-based network, this layer is the network layer also referred as the IP layer. Again this layer is composed of multiple fields. For simplification of the description, FIG. 4 presents the IP Source Address 4210, the IP Destination Address 4220 and the rest of the IP header 4200. Adding the TCP/UDP layer information 4230 results in a complete IP packet.

The last layer to be formed before the Ethernet Test Frame can be transmitted on the network is the Data Link layer, also called the Ethernet layer. This layer comprises the following fields: the MAC Destination Address 4400, the MAC Source Address 4410, the Type field 4420, the Higher Layer Information field 4430 and the Frame Check Sequence (FCS) 4440. The Higher Layer Information field is basically the encapsulated IP packet that includes all of the higher layer protocols. The FCS is used to validate the integrity of the Ethernet Frame and is sometimes called Ethernet Trailer. With all of the information included in the Ethernet Test Frame, it is now possible to communicate from a Local Test Apparatus to a Remote one and test a network.

FIG. 5 illustrates in more detail the Test Management Header 5230 shown in FIG. 4 (4000) which is used to transfer test information between the Local and Remote Test Apparatus. The information usually sent from the Local and Remote Test Apparatus are configuration and test management commands (start/stop test, keep alive message, etc.). When transferring information from the Remote to Local Test Apparatus, the information is mostly test statuses and intermediate or final test results. The Test Management Header is made of multiple fields. The first field is an identifier field 5300 used to recognize that this header is a Test Management Header. This field is useful as it differentiates this test application from other applications that could run over a TCP/UDP transport layer.

The second field is the Version field 5310, which allows the Local and Remote Test apparatus 1000/1200 to make sure that the different versions of software used are interoperable. The next field is the Traffic ID 5320. This field isolates each of the results on a per service under test. The Control Information field 5330 provides the mechanism to use the Test Management Header as a configuration tool, an intermediate status and result transport field or a final test result status and result transport field. The Information Field 5340 provides the payload to the Control Information field. This field is used to logically transfer information between test apparatus. Finally, the In-band Control/Length field 5350 will provide a way to extend the information field in the event that not all of the configuration or status and test results will fit into one information field. This field is also used to start or stop the test at the Remote Test Apparatus.

A test management header is used in conjunction with test traffic to fill the application payload as found in a transmission packet. This test layer will be encapsulated in a Transmission Control Protocol (TCP) or User Datagram Protocol (UDP) segment. The next step is to encapsulate it in an Internet Protocol (IP) packet and finally an Ethernet frame. It is then transmitted across the network circuit under test and received by the other test apparatus.

When the test traffic with management information is received at the local test apparatus 1000, it will be demultiplexed into management information to be communicated to the test communication manager and test traffic to be sent to the local analysis engine. At the local test and communication manager 1025, the results and statuses from the remote test apparatus will be displayed and sent to the reporting engine for the final report.

5. Test Completion

As shown in FIGS. 3 and 6, once the test is completed 3025, 6230 (either manually or from a timer configured in the test configuration), the final test results and statuses are transferred back from the remote test apparatus to the local test apparatus 3125, 6330. The results from both the local and remote analysis engine will be assembled 3030, 6240 and displayed 3035, 6250. Furthermore, a report can be created with the complete test information, statuses and results.

Referring to FIG. 6, which is a more detailed view of the transmission process between Local and Remote Test apparatus combining the view of the traffic information flow and the test management information flow, it will be seen that, once the test is started on the Local Test Apparatus 3015, 6205 a start message is sent to the Remote Test Apparatus 3115, 6305. At the Local Test Apparatus, once the test is started, management information will start being transmitted to the remote test apparatus 6010 in the Test Management header, test traffic being added to the management information 6110 and the Ethernet test frame with Test Management Header will be transmitted to the Remote Test Apparatus 6210.

Once the Ethernet test frame arrives at the Remote Test Apparatus, the traffic will be buffered and demultiplexed 6310. The Test Traffic will be analyzed 6410 by the Remote Analysis Engine. The received test results and status will be created by the Analysis Engine 6510 and will be sent to the Remote Test and Communication Management (TCM). The TCM will buffer the information and send it back to the Local Test Apparatus 6520. The information will be placed in the Test Management Header and Test Traffic will be added 6420. The resulting payload will be placed in an Ethernet Test Frame and sent to the Local Test Apparatus 6320. Once the Ethernet Test Frame is received 6220 by the Local Test Apparatus 1000, the Test Management Header and Test Traffic will be demultiplexed, the Test traffic will be analyzed 6120 by the Local Analysis Engine and Test Results and Status will be created 6020. All results from both Local-to-Remote and Remote-to-Local direction will be assembled and displayed 6240, 6250.

In previously-known testing methodologies, the exchange of test information is only possible when the test is idle, which means that there is no test traffic unless the two apparatus are in-between tests or the test has been completed. Should a test be performed over a long period of time, for example a 24 hour test, the local user would only know about the test status and results at the end of the test. An advantage of embodiments of the present invention, in which test information is communicated while the test is still running, is that the local user could have a real-time view of the remote status and intermediate results as measured on the remote test apparatus. Consequently, the test could be aborted or modified without wasting time by waiting for the test to conclude. For example, if, while the test was only partially completed, the Remote Test Apparatus detected that a critical test requirement already had not been met, e.g., the bit error rate had already exceeded a preset level, it could return this information as an interim test result (along with the test status as "still running") so that the operator at the Local Test Apparatus could decide whether or not to abort the test, i.e., without waiting for more complete test results, perhaps providing more quantitative information, such as the actual total bit error rate and where the errors occurred.

In the above-described embodiment, the functions are implemented in software running on either a Field Programmable Gate Array (FPGA) or an on-board management processor. The FPGA will do the operations that need to be line rate whereas the other functions may be performed by the on-board processor.

For simplicity, the foregoing description of the preferred embodiment uses only one logical connection. It should be appreciated, however, that the local test apparatus may have connectivity to multiple remote test apparatus through multiple network links. Thus, in networks using Ethernet technology, it is possible to have multiple sites (or in this case test apparatus) connected together over long distances.

INDUSTRIAL APPLICABILITY

The above-described preferred embodiments of the invention are useful for testing links in a packet-based network, but it should be understood that the invention is not limited to such networks but can also be applied to communication networks that are not packet-based. For example, the Test/Communication Manager header could be added in the test payload or the unused overhead bytes of a SONET or SDH signal and transmitted across a network.

Although an embodiment of the invention has been described and illustrated in detail, it is to be clearly understood that the same is by way of illustration and example only and not to be taken by way of limitation, the scope of the present invention being limited only by the appended claims.

The invention claimed is:

1. Apparatus for performing bi-directional testing in a link of a communications network, the apparatus comprising local test apparatus for connection to one end of the link and remote test apparatus for connection to an opposite end of the link, wherein the local test apparatus is operable to transmit local-to-remote test traffic to the remote test apparatus by way of the link, and the remote test apparatus is operable to analyze the local-to-remote test traffic and, while doing so, transmit to the local test apparatus by way of the link test information including interim local-to-remote test results and remote-to-local test traffic for analysis by the local test apparatus, wherein the interim local-to-remote test results are encapsulated with the remote-to-local test traffic and wherein the local test apparatus is further operable to extract and analyze the remote-to-local test traffic to produce remote-to-local test results, detect the interim local-to-remote test results from the remote test apparatus and consolidate the interim local-to-remote test results with the remote-to-local test results.

2. Apparatus according to claim 1, wherein that the local test apparatus is operable to transmit to the remote test apparatus test management information defining remote-to-local test traffic to be sent by the remote test apparatus to the local test apparatus by way of the link, the local test apparatus being operable to analyze the remote-to-local test traffic from the remote test apparatus to determine characteristics of the link in the remote-to-local direction.

3. Apparatus according to claim 1, wherein the interim test results are included in a transmission header with the remote-to-local test traffic being payload.

4. Apparatus according to claim 1, wherein the test information from the remote test apparatus also includes present status of the remote test apparatus.

5. Apparatus according to claim 1, wherein the local test apparatus and remote test apparatus exchange respective transmissions each comprising a header including the test information and a payload including, respectively, the local-to-remote and remote-to-local test traffic.

6. Apparatus according to claim 5, wherein the transmissions comprise packets.

7. Apparatus according to claim 1, wherein the interim test results comprise an indication that a critical requirement already has not been met.

8. Apparatus for performing bi-directional testing in a link of a communications network comprising local test apparatus for connection to a local end of the link and remote test apparatus for connection to a remote end of the link, the local test apparatus and the remote test apparatus each being operable to transmit and receive in-band test traffic over the link and analyze received test traffic according to prescribed test procedures to obtain test results;

the local test apparatus being operable to transmit to the remote test apparatus via the link test information including test management information defining the prescribed test procedures to be carried out upon local-to-remote test traffic to be transmitted by the local test apparatus and received by the remote test apparatus; the remote test apparatus being operable to receive the test management information, determine the test procedures to be carried out upon subsequently-received local-to-remote test traffic from the local test apparatus and send a confirmation transmission to the local test apparatus;

the local test apparatus being operable to detect the confirmation transmission and transmit to the remote test apparatus further test information comprising a header containing test management information and local-to-remote test traffic for testing the link in the local-to-remote direction;

the remote test apparatus being operable to receive the further test information and test traffic, analyze the local-to-remote test traffic in accordance with the prescribed test procedure, and, while analyzing of the local-to-remote test traffic is ongoing, transmit to the local test apparatus test information relating to the analysis of the received local-to-remote test traffic, said test information including at least interim test results, and remote-to-local test traffic for analysis by the local test apparatus to test the link in the remote-to-local direction;

the local test apparatus being further operable, on receipt of the further test information from the remote test apparatus, to extract and analyze the remote-to-local test traffic to determine characteristics of the link in the remote-to-local direction, detect the interim test results from the remote test apparatus; and consolidate the test results for both directions of the link.

9. A method of performing bi-directional testing in a link of a communications network using local test apparatus connected to one end of the link and remote test apparatus connected to an opposite end of the link, the method comprising using the local test apparatus, transmitting local-to-remote test traffic to the remote test apparatus by way of the link;

using the remote test apparatus, analyzing the local-to-remote test traffic and, while doing so, transmitting to the local test apparatus by way of the link test information including interim test results and remote-to-local test traffic for analysis by the local test apparatus, wherein the interim test results are encapsulated with the remote-to-local test traffic;

using the local test apparatus, extracting and analyzing the remote-to-local test traffic to produce remote-to-local test results, detecting the interim test results from the remote test apparatus and consolidating the interim test results with the remote-to-local test results.

10. A method according to claim 9, wherein the local test apparatus is used to transmit to the remote test apparatus test management information defining remote-to-local test traffic to be sent by the remote test apparatus to the local test apparatus by way of the link, the local test apparatus being used to analyze the remote-to-local test traffic from the remote test apparatus to determine characteristics of the link in the remote-to-local direction.

11. A method according to claim 9, wherein the interim test results are included in a transmission header with the remote-to-local test traffic being payload.

12. A method according to claim 9, wherein the test information from the remote test apparatus also includes present status of the remote test apparatus.

13. A method according to claim 9, wherein the local test apparatus and remote test apparatus are used to exchange respective transmissions each comprising a header including the test information and a payload including, respectively, the local-to-remote and remote-to-local test traffic.

14. A method according to claim 13, wherein the transmissions comprise packets.

15. A method according to claim 9, wherein the interim test results comprise an indication that a critical requirement already has not been met.

16. A method of performing bi-directional testing in a link of a communications network using local test apparatus at a local end of the link and remote test apparatus at a remote end of the link, the local test apparatus and the remote test apparatus each being capable of transmitting and receiving in-band test traffic over the link and analyzing received test traffic according to prescribed test procedures to obtain test results, the method comprising the steps of:

at the local test apparatus, transmitting to the remote test apparatus via the link test information including test management information defining the prescribed test procedures to be carried out upon local-to-remote test traffic to be transmitted by the local test apparatus and received by the remote test apparatus;

at the remote test apparatus, receiving the test management information and determining the test procedures to be carried out upon subsequently-received local-to-remote test traffic from the local test apparatus and sending a confirmation transmission to the local test apparatus;

at the local test apparatus, detecting the confirmation transmission and transmitting to the remote test apparatus further test information comprising a header containing test management information and local-to-remote test traffic for testing the link in the local-to-remote direction;

at the remote test apparatus, receiving the further test information and test traffic, analyzing the local-to-remote test traffic in accordance with the prescribed test procedure, and, while the analyzing of the local-to-remote test traffic is ongoing, transmitting to the local test apparatus test information relating to the analysis of the received local-to-remote test traffic, said information including at least interim test results, and remote-to-local test traffic for analysis by the local test apparatus to test the link in the remote-to-local direction;

at the local test apparatus, receiving the further test information from the remote test apparatus, extracting and analyzing the remote-to-local test traffic to determine characteristics of the link in the remote-to-local direction, detecting the interim test results from the remote test apparatus; and consolidating all test results on the local test apparatus.

* * * * *